(12) United States Patent
Nagata et al.

(10) Patent No.: US 10,828,866 B2
(45) Date of Patent: *Nov. 10, 2020

(54) DECORATIVE SHEET

(71) Applicants: DAIHATSU MOTOR CO., LTD., Ikeda-shi, Osaka (JP); KYOWA LEATHER CLOTH CO.,LTD., Hamamatsu-Shi, Shizuoka (JP)

(72) Inventors: Jun Nagata, Ikeda (JP); Akira Sakabe, Ikeda (JP); Kazuyoshi Baba, Ikeda (JP); Tadahiko Inagaki, Hamamatsu (JP); Haruyuki Ishizu, Hamamatsu (JP); Keiko Nakada, Hamamatsu (JP)

(73) Assignees: DAIHATSU MOTOR CO., LTD., Osaka (JP); KYOWA LEATHER CLOTH CO.,LTD., Shizuoka (JP)

( * ) Notice: Subject to any disclaimer, the term of this patent is extended or adjusted under 35 U.S.C. 154(b) by 258 days.

This patent is subject to a terminal disclaimer.

(21) Appl. No.: 15/566,849

(22) PCT Filed: Dec. 17, 2015

(86) PCT No.: PCT/JP2015/085373
§ 371 (c)(1),
(2) Date: Oct. 16, 2017

(87) PCT Pub. No.: WO2016/166922
PCT Pub. Date: Oct. 20, 2016

(65) Prior Publication Data
US 2018/0093450 A1     Apr. 5, 2018

(30) Foreign Application Priority Data
Apr. 17, 2015   (JP) .................. 2015-085267

(51) Int. Cl.
*B32B 7/06*     (2019.01)
*B32B 27/00*    (2006.01)
(Continued)

(52) U.S. Cl.
CPC ............... *B32B 7/06* (2013.01); *B32B 27/00* (2013.01); *B32B 27/08* (2013.01); *B32B 27/18* (2013.01);
(Continued)

(58) Field of Classification Search
CPC ........... B32B 7/06; B32B 27/00; B32B 27/08
See application file for complete search history.

(56) References Cited

U.S. PATENT DOCUMENTS

2018/0104886 A1* 4/2018 Nagata .................. B32B 27/00

FOREIGN PATENT DOCUMENTS

| EP | 3281786 A1 | 2/2018 |
| JP | 01-020048 B2 | 4/1989 |

(Continued)

OTHER PUBLICATIONS

Translation of JP 2002-052568.*
(Continued)

*Primary Examiner* — Victor S Chang
(74) *Attorney, Agent, or Firm* — Buchanan Ingersoll & Rooney PC

(57) ABSTRACT

Provided are a decorative sheet which has excellent processability and with which an increase in workability during mounting can be achieved, a formed sheet obtained by forming the decorative sheet, and a formed sheet manufacturing method. The decorative sheet 1 is provided with a release layer 2, a pressure-sensitive adhesive layer 3 disposed on a surface of the release layer 2, and a skin layer 4 disposed on a surface of the pressure-sensitive adhesive layer 3. The release layer 2 includes a shape retention layer
(Continued)

5 and an easy release layer 6 interposed between the pressure-sensitive adhesive layer 3 and the shape retention layer 5. The shape retention layer 5 is a resin sheet made from an acrylonitrile-butadiene-styrene copolymer. The shape retention layer 5 has a thickness of not less than 100 μm and not more than 700 μm.

5 Claims, 2 Drawing Sheets

(51) Int. Cl.
    *B32B 27/32*       (2006.01)
    *B32B 27/08*       (2006.01)
    *B32B 27/30*       (2006.01)
    *B32B 27/18*       (2006.01)
    *B32B 7/12*        (2006.01)

(52) U.S. Cl.
    CPC .......... *B32B 27/302* (2013.01); *B32B 27/304* (2013.01); *B32B 27/308* (2013.01); *B32B 27/32* (2013.01); *B32B 7/12* (2013.01); *B32B 2307/30* (2013.01); *B32B 2307/732* (2013.01); *B32B 2451/00* (2013.01); *B32B 2605/003* (2013.01)

(56) References Cited

FOREIGN PATENT DOCUMENTS

| JP | 05-245981 A | | 9/1993 | |
| JP | 2002-052568 A | | 2/2002 | |
| JP | 2002052568 A | * | 2/2002 | ........... B29C 43/203 |
| JP | 2006-281451 A | | 10/2006 | |
| JP | 2012-213891 A | | 11/2012 | |

OTHER PUBLICATIONS

Typical Properties of Generic ABS, Feb. 7, 2020. (Year: 2020).*
Extended European Search Report dated Oct. 4, 2018, issued by the European Patent Office in corresponding European Application No. 15889256.2. (6 pages).
International Search Report (PCT/ISA/210) dated Mar. 15, 2016, by the Japanese Patent Office as the International Searching Authority for International Application No. PCT/JP2015/085373.
Written Opinion (PCT/ISA/237) dated Mar. 15, 2016, by the Japanese Patent Office as the International Searching Authority for International Application No. PCT/JP2015/085373.

* cited by examiner

DECORATIVE SHEET

TECHNICAL FIELD

The present invention relates to a decorative sheet.

BACKGROUND ART

It is conventionally known to provide the interior or exterior of a vehicle, a building and the like with a design by attaching a decorative sheet, such as a cosmetic material. More specifically, for example, it is known to attach a carbon fiber-printed decorative sheet onto the external surface of the hood of an automobile, so that the hood is decorated to appear as if it were a reduced-weight hood.

As an example of such decorative sheet, an automobile interior component has been proposed in which a soft skin material is pressure-bonded onto a core material and integrally adhered thereto (see Patent Document 1, for example).

The automobile interior component is normally formed in a flat sheet. When the automobile interior component is used, the automobile interior component is attached to an adherend via a separately prepared adhesive agent or adhesive tape, for example, while the component is heated with a dryer and the like and thereby stretched in conformity with the shape of the adherend.

However, the automobile interior component has the problem in that the attaching operation is cumbersome. In order to improve the workability, it has been proposed, for example, to stack an adhesive layer on the decorative sheet in advance, and further stack a release layer on the adhesive layer.

More specifically, for example, a cosmetic sheet has been proposed comprising a vinyl chloride resin sheet to a back surface of which a synthetic resin pressure-sensitive adhesive is applied and a release paper is attached (see Patent Document 2, for example).

When the cosmetic sheet is used, the lease paper is peeled off, and the vinyl chloride resin sheet is pressure-bonded (attached) to an adherend via the exposed synthetic resin pressure-sensitive adhesive.

CITATION LIST

Patent Literature

Patent Document 1: JP-B-H1-020048
Patent Document 2: JP-A-H5-245981

SUMMARY OF INVENTION

Problems to be Solved by the Invention

The above-described cosmetic sheet is also normally formed in a flat sheet shape. Accordingly, when in use, it is necessary to attach the cosmetic sheet to the adherend while stretching the cosmetic sheet in conformity with the shape of the adherend, thus making the attaching operation cumbersome.

In order to improve workability, it has been considered to hot-form the decorative sheet in advance, and then perform processing in conformity with the shape of the adherend.

However, heating the cosmetic sheet may cause the cosmetic sheet to be deformed in an unwanted shape or damaged, resulting in a decrease in processability.

An objective of the present invention is to provide a decorative sheet which has excellent processability, and with which an increase in workability during mounting can be achieved.

Solutions to the Problems

In order to achieve the objective, a decorative sheet according to the present invention includes a release layer, a pressure-sensitive adhesive layer disposed on a surface of the release layer, and a skin layer disposed on a surface of the pressure-sensitive adhesive layer. The release layer includes a shape retention layer, and an easy release layer interposed between the pressure-sensitive adhesive layer and the shape retention layer. The shape retention layer is a resin sheet made from an acrylonitrile-butadiene-styrene copolymer. The shape retention layer has a thickness of not less than 100 μm and not more than 700 μm.

In the decorative sheet of the present invention, the shape retention layer may preferably have a softening start temperature of not less than 80° C. and not more than 150° C.

In the decorative sheet of the present invention, the shape retention layer may preferably have a rate of elongation at 120° C. of not less than 200%.

Effects of the Invention

The decorative sheet of the present invention is a resin sheet in which the shape retention layer is made from an acrylonitrile-butadiene-styrene copolymer. The decorative sheet has a thickness in a predetermined range indicated above. Accordingly, deformation of the decorative sheet in an unwanted shape or a damage to the decorative sheet during forming can be suppressed. Thus, the decorative sheet of the present invention has excellent processability, and also has excellent workability during mounting.

DESCRIPTION OF EMBODIMENTS

Figure 1:
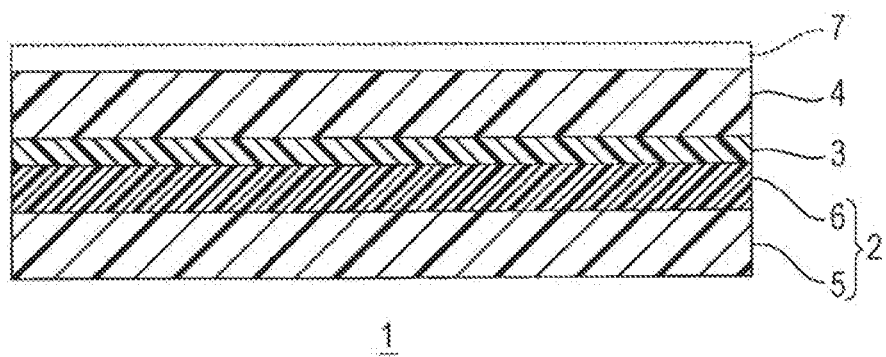
FIG. 1 is a schematic configuration diagram illustrating an embodiment of a decorative sheet according to the present invention.

Referring to FIG. 1, a decorative sheet 1 includes a release layer 2, a pressure-sensitive adhesive layer 3 disposed on a surface of the release layer 2, and a skin layer 4 disposed on a surface of the pressure-sensitive adhesive layer 3.

The release layer 2 is attached to the pressure-sensitive adhesive layer 3 in order to protect the pressure-sensitive adhesive layer 3 and to support the skin layer 4. The release layer 2 is a sheet member that can be easily peeled from the pressure-sensitive adhesive layer 3. The release layer 2 includes a shape retention layer 5 and an easy release layer 6 interposed between the pressure-sensitive adhesive layer 3 and the shape retention layer 5.

The shape retention layer 5, as will be described in detail later, is provided in the release layer 2 in order to retain a desired shape when the decorative sheet 1 is formed.

For example, the shape retention layer 5 has a sheet shape extending in a planar direction (orthogonal directions with respect to a thickness direction; i.e., a right-left direction and a front-rear direction), and has a substantially rectangular shape as viewed in plan.

The shape retention layer 5 may include a resin sheet made from an acrylonitrile-butadiene-styrene copolymer (ABS resin). In other words, the shape retention layer 5 can be obtained by forming ABS resin into a sheet shape by a known method.

The ABS resin can be obtained by copolymerizing acrylonitrile, butadiene, and styrene by a known polymerization method, such as a blend polymerization method or a graft polymerization method.

The polymerization ratios of the acrylonitrile, butadiene, and styrene in the ABS resin are not particularly limited. The polymerization ratios are adjusted so that, for example, the resin sheet of ABS resin (i.e., the shape retention layer 5) has a softening start temperature and a rate of elongation (breaking elongation) in predetermined ranges.

The softening start temperature of the shape retention layer 5 is, e.g., not less than 60° C., preferably not less than 80° C., and more preferably not less than 95° C. The softening start temperature of the shape retention layer 5 is, e.g., not more than 180° C., preferably not more than 150° C., more preferably not more than 120° C., even more preferably not more than 110° C., and particularly preferably not more than 105° C.

When the softening start temperature of the shape retention layer 5 is in the above ranges, superior processability can be obtained.

The softening start temperature is the temperature at which deformation begins when the object of measurement is heated in a no-load state, and is measured according to JIS K 7196 (1999).

The rate of elongation (breaking elongation) of the shape retention layer 5 at 120° C. is, e.g., not less than 180%, preferably not less than 200%, more preferably not less than 220%, and normally not more than 150%, depending on thickness as will be described later.

When the rate of elongation of the shape retention layer 5 is in the above ranges, superior processability can be obtained.

The rate of elongation is measured according to JIS K 6734 (2010).

The thickness of the shape retention layer 5 is not less than 100 μm, preferably not less than 150 μm, more preferably not less than 200 μm, and even more preferably not less than 300 μm. The thickness of the shape retention layer 5 is not more than 700 μm, preferably not more than 600 μm, and more preferably not more than 500 μm.

The easy release layer 6 is a sheet member that has an easy peel property with respect to the pressure-sensitive adhesive layer 3. The easy release layer 6 is provided for peeling the release layer 2 (shape retention layer 5) from the pressure-sensitive adhesive layer 3.

For example, the easy release layer 6 has a sheet shape extending in the planar direction, and has a substantially rectangular shape, as viewed in plan.

The easy release layer 6 may include a resin sheet, nonwoven fabrics, paper, or metal foil, for example. These may be used either alone or in combination of two or more thereof. The easy release layer 6 may preferably include a resin sheet.

When the easy release layer 6 is a resin sheet, the softening start temperature and rate of elongation of the resin sheet are not particularly limited and may be selected as appropriate.

Specific examples of the resin from which the easy release layer 6 (resin sheet) may be configured include: crystalline resins such as polypropylene (PP), ethylene-vinyl acetate (EVA), polyethylene (PE, such as high-density polyethylene (HDPE)), polyacetal (POM); polybutylene terephthalate (PBT), polyethylene terephthalate (PET), polyphenylene sulfide (PPS), polyamide (PA, such as nylon 6, nylon 6, 6), and polyetheretherketone (PEEK); and amorphous resins such as acrylonitrile-butadiene-styrene copolymer (ABS), polystyrene (PS), acrylonitrile: styrene copolymer (AS), polycarbonate (PC), polyvinyl chloride (PVC), and polymethacrylic acid methyl ester (PMMA).

The resins from which the easy release layer 6 may be configured may be used either alone or in combination of two or more thereof.

The resin from which the easy release layer 6 may be configured may preferably include a crystalline resin and more preferably polypropylene (PP).

By using the above resins as the resin from which the easy release layer 6 is configured, excellent easy peel property can be obtained.

The thickness of the easy release layer 6 is, e.g., not less than 10 μm, preferably not less than 30 μm, and more preferably not less than 50 μm. The thickness of the easy release layer 6 is, e.g., not more than 100 μm, preferably not more than 80 μm, and more preferably not more than 60 μm.

The thickness of the shape retention layer 5 relative to the thickness of the easy release layer 6 is greater by a factor of not less than 1, preferably not less than 2, and more preferably not less than 5, for example. The thickness of the shape retention layer 5 relative to the thickness of the easy release layer 6 is greater by a factor of not more than 50, preferably not more than 20, and more preferably not more than 10, for example.

The easy release layer 6 is stacked on the shape retention layer 5 by a known method. Specifically, for example, the shape retention layer 5 and the easy release layer 6 may be adhered to each other using a known adhesive (not illustrated). In this way, the easy release layer 6 and the shape retention layer 5 are bonded to each other, whereby the release layer 2 is obtained.

The thickness of the release layer 2 (a total thickness of the shape retention layer 5 and the easy release layer 6) is, for example, not less than 150 μm, preferably not less than 200 μm, and more preferably not less than 350 μm. The thickness of the release layer 2 is, for example, not more than 1000 μm, preferably not more than 800 μm, and more preferably not more than 600 μm.

The pressure-sensitive adhesive layer 3 is formed from a known pressure-sensitive adhesive, for example.

Examples of the pressure-sensitive adhesive include acrylic pressure-sensitive adhesives, urethane-based pressure-sensitive adhesives, epoxy-based pressure-sensitive adhesives, silicone-based pressure-sensitive adhesives, polyester-based pressure-sensitive adhesives, polyamide-based pressure-sensitive adhesives, vinyl alkyl ether-based pressure-sensitive adhesives, fluorine-based pressure-sensitive adhesives, and rubber-based pressure-sensitive adhesives.

These pressure-sensitive adhesives may be used either alone or in combination of two or more thereof.

The pressure-sensitive adhesive may preferably include an acrylic pressure-sensitive adhesive.

The acrylic pressure-sensitive adhesive is a pressure-sensitive adhesive composed mainly from (meth)acrylic alkyl ester, and can be obtained by a known method, for example.

The form of the pressure-sensitive adhesive is not particularly limited, and may include various forms, such as solid pressure-sensitive adhesive, solvent-based pressure-sensitive adhesive, emulsion-based pressure-sensitive adhesive, and oligomer-based pressure-sensitive adhesive.

The method for stacking the pressure-sensitive adhesive layer 3 on the release layer 2 is not particularly limited. For example, the pressure-sensitive adhesive is applied to the surface of the release layer 2 by a known method and heated, as needed. In this way, the pressure-sensitive adhesive layer 3 is stacked on the surface of the release layer 2.

The surface of the pressure-sensitive adhesive layer 3 has adhesion (surface tackiness).

The thickness of the pressure-sensitive adhesive layer 3 is, for example, not less than 20 μm and preferably not less than 30 μm. The thickness of the pressure-sensitive adhesive layer 3 is, for example, not more than 100 μm and preferably not more than 70 μm.

The skin layer 4, as will be described in detail later, is provided to impart a design to an adherend (which will be described later) when a formed sheet 10 (which will be described later) obtained from the decorative sheet 1 is attached to the adherend (which will be described later).

The skin layer 4, for example, has a sheet shape extending in the planar direction, and has a substantially rectangular shape as viewed in plan.

The skin layer 4 may include a resin sheet, nonwoven fabrics, paper, or metal foil. These may be used either alone or in combination of two or more thereof. The skin layer 4 may preferably include a resin sheet.

When the skin layer 4 is a resin sheet, the softening start temperature and the rate of elongation of the resin sheet are not particularly limited and may be selected as appropriate.

Specific examples of the resin from which the skin layer 4 (resin sheet) is configured include: crystalline resins such as polypropylene (PP), ethylene-vinyl acetate (EVA), polyethylene (PE, such as high-density polyethylene (HDPE)), polyacetal (POM), polybutylene terephthalate (PBT), polyethylene terephthalate (PET), polyphenylene sulfide (PPS), polyamide (PA, such as nylon 6 or nylon 6, 6), and polyetheretherketone (PEEK); and amorphous resins such as acrylonitrile-butadiene-styrene copolymer (ABS), polystyrene (PS), acrylonitrile-styrene copolymer (AS), polycarbonate (PC), polyvinyl chloride (PVC), and polymethacrylic acid methyl ester (PMMA).

These resins from which the skin layer 4 may be configured may be used either alone or in combination of two or more thereof.

The resin from which the skin layer 4 is configured may preferably include a crystalline resin and more preferably include polyvinyl chloride (PVC).

By using the above resin sheet as the skin layer 4, excellent shape retention can be obtained.

The thickness of the skin layer 4 is, for example, not less than 50 μm, preferably not less than 100 μm, and more preferably not less than 150 μm. The thickness of the skin layer 4 is, for example, not more than 500 μm, preferably not more than 300 μm, and more preferably not more than 200 μm.

The thickness of the skin layer 4 relative to the thickness of the pressure-sensitive adhesive layer 3 is, for example, not less than 100%, preferably not less than 200%, and more preferably not less than 300%. The thickness of the skin layer 4 relative to the thickness of the pressure-sensitive adhesive layer 3 is, for example, not more than 600%, preferably not more than 500%, and more preferably not more than 400%.

The thickness of the skin layer 4 relative to the thickness of the release layer 2 is, for example, not less than 10%, preferably not less than 20%, and more preferably not less than 30%. The thickness of the skin layer 4 relative to the thickness of the release layer 2 is, for example, not more than 200%, preferably not more than 100%, more preferably not more than 70%, and even more preferably not more than 65%.

The skin layer 4 is stacked on the surface of the pressure-sensitive adhesive layer 3 by a known method. In this way, the release layer 2 and the skin layer 4 are bonded to each other via the pressure-sensitive adhesive layer 3, whereby the decorative sheet 1 is obtained.

As indicated by dashed line in FIG. 1, the decorative sheet 1 may be further provided with a coat layer 7.

The coat layer 7 is disposed on a surface of the skin layer 4 in order to protect the skin layer 4, for example.

The coat layer 7 is formed from a known coating agent, for example.

Examples of the coating agent include an acrylic coating agent, a urethane-based coating agent, a fluorine-based coating agent, and a silicone-based coating agent.

These coating agents may be used either alone or in combination of two or more thereof.

The coating agent may preferably include fluorine-based coating.

The method for stacking the coat layer 7 is not particularly limited. For example, a coating agent is applied to the surface of the skin layer 4 by a known method, and dried. In this way, the coat layer 7 is stacked on the surface of the skin layer 4. Alternatively, the coat layer 7 may be formed separately from the skin layer 4, and then the coat layer 7 may be stacked on the skin layer 4 using an adhesive and the like.

As the coat layer 7, a resin film (for example, acrylic resin film, urethane-based resin film, fluorine-based resin film, and silicone-based resin film) may be used. In this case, the coat layer 7 (resin film) is attached to the skin layer 4 via an adhesive, as needed.

The thickness of the coat layer 7 is, for example, not less than 20 μm, and preferably not less than 30 μm. The thickness of the coat layer 7 is, for example, not more than 100 μm and preferably not more than 70 μm.

The thickness of the decorative sheet 1 (total thickness) is, for example, not less than 300 μm and preferably not less than 400 μm. The thickness of the decorative sheet 1 (total thickness) is, for example, not more than 1000 μm and preferably not more than 700 μm.

The decorative sheet 1 may be provided with arbitrary figures or patterns by a known method for design enhancement. For example, between the skin layer 4 and the pressure-sensitive adhesive layer 3, or between the skin layer 4 and the coat layer 7, a design layer (not illustrated) with an arbitrary figure or pattern may be interposed. The skin layer 4 or the coat layer 7 may be directly processed and provided with an arbitrary figure or pattern.

In the decorative sheet 1, the shape retention layer 5 is a resin sheet made from acrylonitrile-butadiene-styrene copolymer, with the thickness in the above-described predetermined range. Accordingly, deformation of the decorative sheet 1 in an unwanted shape or a damage to the decorative sheet 1 when being formed can be suppressed. Thus, the decorative sheet 1 has excellent processability and also has excellent workability during mounting.

The decorative sheet 1 is suitably used for manufacturing a formed sheet 10 (see FIG. 2D) that has been three-dimensionally processed into a 3D shape. That is, the formed sheet (see FIG. 2D) can be obtained by forming the decorative sheet 1.

The forming method is not particularly limited, and may include vacuum forming and hot forming such as hot press forming; preferably, vacuum forming may be used. By vacuum forming, the formed sheet can be obtained with increased efficiency.

In the following, a method for manufacturing the formed sheet by a vacuum forming method will be described.

Figure 2A:
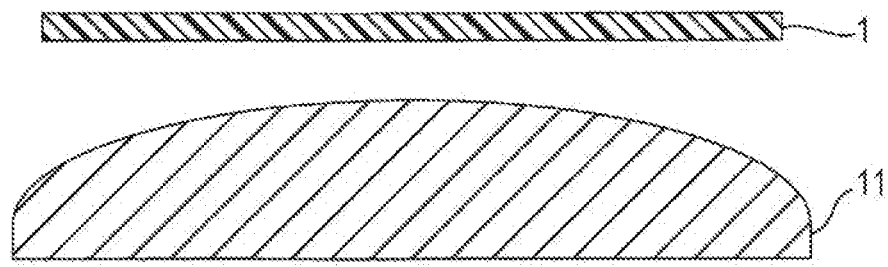
FIG. 2 is a schematic step diagram illustrating an embodiment of a formed sheet manufacturing method according to the present invention, FIG. 2A illustrating the step of preparing a decorative sheet.
FIG. 2B illustrating the step of heating the decorative sheet.
FIG. 2C illustrating the step of vacuum forming the decorative sheet.
FIG. 2D illustrating the step of removing the formed sheet from a vacuum forming die.

More specifically, in this method, initially the decorative sheet 1 is prepared, as illustrated in FIG. 2A (preparation step).

In the preparation step, a vacuum forming die 11 for forming the decorative sheet 1 is also prepared.

The vacuum forming die 11 is a known die. The shape of the vacuum forming die 11 is not particularly limited. Preferably, a sticking surface of the decorative sheet 1 (i.e., the surface at which, as will be described later, the decorative sheet 1 and the vacuum forming die 11 contact each other when the decorative sheet 1 sticks to the vacuum forming die 11 (see FIG. 2C)) has the same shape as an attaching surface of the formed sheet 10 on the adherend (which will be described later).

Then, in this method, the decorative sheet 1 is vacuum-formed using the vacuum forming die 11.

Figure 2B:
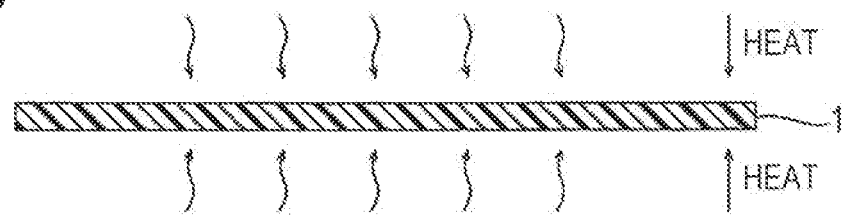

More specifically, in this method, as illustrated in FIG. 2B, the skin layer 4 side and the release layer 2 side of the decorative sheet 1 are respectively heated (pre-heating).

The heating temperature (pre-heating temperature) is set, as appropriate, in accordance with the material of the decorative sheet 1. For example, when the skin layer 4 of the decorative sheet 1 is a resin sheet, the heating temperature for the skin layer 4 side is set in accordance with the softening start temperature of the resin sheet. When the release layer 2 of the decorative sheet 1 is a resin sheet, the heating temperature for the release layer 2 side is set, as appropriate, in accordance with the softening start temperature of the resin sheet.

The heating time is, for example, not less than 60 seconds and preferably not less than 70 seconds. The heating time is, for example, not more than 150 seconds and preferably not more than 100 seconds.

By the heating, the decorative sheet 1 is softened and becomes formable.

Figure 2C:
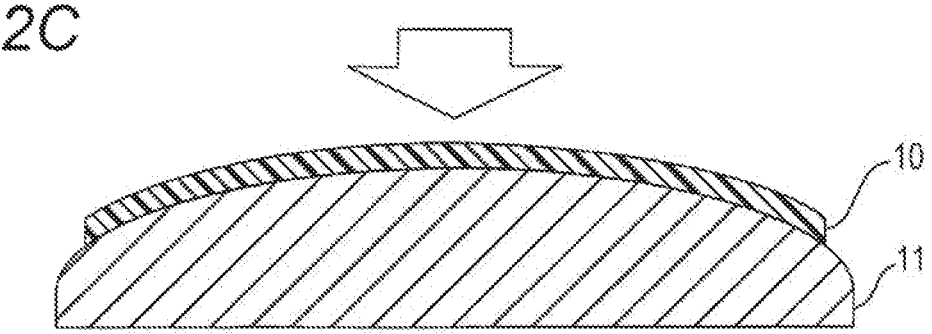

Then, in this method, as illustrated in FIG. 2C, the decorative sheet 1 is vacuum pressure-bonded to the vacuum forming die 11 and vacuum-formed.

More specifically, in this step, the decorative sheet 1 is placed over the vacuum forming die 11. Thereafter, depressurization is performed by a depressurization means (not illustrated) to remove air between the decorative sheet 1 and the vacuum forming die 11.

During the vacuum forming, preferably, the vacuum forming die 11 is heated to 70 to 90° C. (preferably, 80° C.), for example.

As a result, the decorative sheet 1 sticks to the vacuum forming die 11 due to the atmospheric pressure, and the decorative sheet 1 is deformed along the shape of the vacuum forming die 11 at the contact surface. In this way, the formed sheet 10 is obtained. In this case, by using the vacuum forming die 11 that has the same dimensions and the same shape with the adherend (which will be described later), the formed sheet 10 that has the same dimensions and the same shape with the adherend (which will be described later) is obtained by the vacuum forming.

Figure 2D:
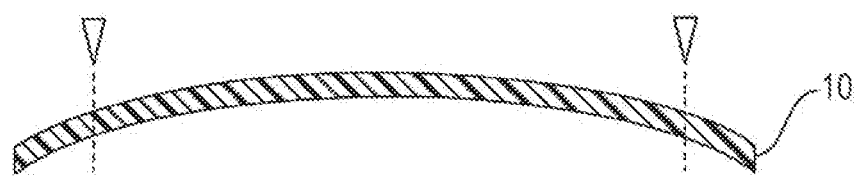

Then, in this method, the obtained formed sheet 10 is allowed to cool, and, as illustrated in FIG. 2D, is detached from the vacuum forming die 11. As needed, unwanted portions are cut off from the formed sheet 10 (see the dashed line).

The formed sheet 10 thus obtained using the decorative sheet 1 has excellent processability, and also has excellent workability during mounting.

According to the method for manufacturing the formed sheet 10, the formed sheet 10 can be efficiently manufactured.

The formed sheet 10 is then attached to the adherend.

The adherend is not particularly limited and may include: automobile interior/exterior materials such as automobile bumpers, roof panels, instrument panels, door trims, and pillars; and interior/exterior materials of buildings. Preferable examples are automobile exterior materials.

The formed sheet 10 is attached by, for example, first peeling off the release layer 2, and then pressure-bonding (attaching) the skin layer 4 to the adherend via the pressure-sensitive adhesive layer 3.

In this way, the formed sheet 10 is attached to the adherend, thereby the adherend can be easily provided with a design.

Accordingly, the decorative sheet 1 and the formed sheet 10 may be preferably used in various fields of industry where design is required, such as various exterior and interior fields relating to automobiles and vehicles, buildings, and furniture.

In the foregoing description, the decorative sheet 1 is three-dimensionally formed into a 3D shape by vacuum forming to obtain the formed sheet. Alternatively, the decorative sheet 1 may be used as the formed sheet 10 without being formed, for example. Further alternatively, the decorative sheet 1 may be used as the formed sheet 10 after performing planar processing, such as cutting, without being three-dimensionally formed.

EXAMPLES

The present invention will be described with reference to Examples and Comparative Examples. The present invention, however, is not limited to the following Examples. The "parts" and "%" are with respect to mass unless otherwise specified. The concrete numerical values of compounding ratios (content ratios), physical values, parameters and the like used in the following may be substituted by upper-limit values (numerical values defined as "not more than" or "less than") or lower-limit values numerical values defined as "not less than" or "exceeding") of the corresponding compounding ratios (content ratios), physical values, parameters and the like indicated in the "DESCRIPTION OF EMBODIMENTS".

The physical properties described in the Examples and Comparative Examples are indicated below.
Softening Start Temperature
  Measured according to JIS K 7196 (1999).
Rate of Elongation
  Measured according to JIS K 6734 (2010).

Example 1

An ABS resin (available under the trade name TOYOLAC by Toray Industries, Inc.) was extruded into a sheet to obtain an ABS resin sheet having a thickness indicated in Table 1. The ABS resin sheet was used as the shape retention layer.

As the easy release layer, a polypropylene resin sheet (PP, softening start temperature 160° C. to 170° C.) having a thickness of 50 μm was prepared.

To the polypropylene resin sheet (easy release layer), the ABS resin sheet (shape retention layer) was affixed via an urethane-based adhesive. In this way, the release layer was obtained.

Then, an acrylic pressure-sensitive adhesive (pressure-sensitive adhesive layer) was applied to the surface of the release layer on the polypropylene resin sheet (easy release layer) side. Via the acrylic pressure-sensitive adhesive, a polyvinyl chloride resin sheet (PVC, softening start temperature 65° C. to 85° C.) having a thickness indicated in Table 1 was affixed to the release layer as the skin layer.

Thereafter, a fluorine-based resin film was affixed to the surface on the polyvinyl chloride resin sheet (skin layer) side, forming the coat layer.

In this way, a decorative sheet provided with the release layer (shape retention layer and easy release layer), the pressure-sensitive adhesive layer, the skin layer, and the coat layer was obtained.

The decorative sheet was formed by a method described below to obtain a formed sheet.

Initially, both surfaces of the decorative sheet were heated (pre-heating) in a heating device for 70 to 100 seconds. During the heating, the heating temperature for the skin layer side was set to 100° C. to 125° C. and the heating temperature for the release layer side was set to 100° C. to 135° C.

The decorative sheet was then vacuum-formed in a vacuum forming machine (type CLC-541 from Asano Laboratories Co., Ltd.), using a vacuum fanning die with automobile roof shape (80° C.). After allowing to cool, the decorative sheet was removed from the die.

In this way, a formed sheet was obtained. The appearance of the formed sheet was visually evaluated. The results are shown in Table 1.

Examples 2 to 4 and Comparative Examples 1 to 4

Decorative sheets were obtained in the same way as in Example 1 with the exception that the shape retention layer comprised resin sheets having thicknesses shown in Table 1.

The decorative sheets were used to obtain formed sheets in the same way as in Example 1. The appearance of the formed sheets was visually evaluated. The results are shown in Table 1.

The standards for the evaluation were as follows.
Formability

If the decorative sheet followed the die satisfactorily and was formable, the evaluation was "Good". If the decorative sheet did not follow the die quite satisfactorily but was formable, the evaluation was "Poor".

If the decorative sheet was not formable due to failure to follow the die, the decorative sheet becoming partly or entirely broken, or the decorative sheet developing a roll-up, the evaluation was "Bad", with reasons attached.

Formed Article Appearance

The appearance of the formed sheet was visually evaluated. Specifically, if the appearance of the formed sheet was satisfactory, the evaluation was "Good". If the appearance of the formed sheet was rather defective due to the development of wrinkles in the formed sheet, for example, the evaluation was "Poor". If it was impossible to obtain the formed sheet, the evaluation was "—(evaluation impossible)".

TABLE 1

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| | Coat layer | | Fluorine-based resin film | Fluorine-based resin film | Fluorine-based resin film | Fluorine-based resin film | Fluorine-based resin film | Fluorine-based resin film | Fluorine-based resin film | Fluorine-based resin film |
| Skin layer | Resin sheet | | PVC | PVC | PVC | PVC | PVC | PVC | PVC | PVC |
| | Thickness (μm) | | 190 | 190 | 190 | 190 | 190 | 190 | 190 | 190 |
| | Pressure-sensitive adhesive layer | | Acrylic pressure-sensitive adhesive | Acrylic pressure-sensitive adhesive | Acrylic pressure-sensitive adhesive | Acrylic pressure-sensitive adhesive | Acrylic pressure-sensitive adhesive | Acrylic pressure-sensitive adhesive | Acrylic pressure-sensitive adhesive | Acrylic pressure-sensitive adhesive |
| Release layer | Easy release layer | Resin sheet | PP | PP | PP | PP | PP | PP | PP | PP |
| | | Thickness (μm) | 50 | 50 | 50 | 50 | 50 | 50 | 50 | 50 |
| | Shape retention layer | Resin sheet | ABS | ABS | ABS | ABS | ABS | ABS | PVC | PP |
| | | Softening start temperature (° C.) | 95 to 105 | 95 to 105 | 95 to 105 | 95 to 105 | 95 to 105 | 95 to 105 | 65 to 85 | 170 (Melting point) |
| | | Rate of elongation (%) | 180 | 240 | 295 | 320 | 140 | 340 | 155 | 300 or more |
| | | Thickness (μm) | 100 | 300 | 500 | 700 | 50 | 900 | 300 | 300 |
| Evaluation | Formability | | Good | Good | Good | Poor | Bad (Break) | Bad (Failure to follow) | Bad (Roll-up) | Bad Roll-up |
| | Formed article appearance | | Poor | Good | Good | Good | — | — | — | — |

The acronyms in the table indicate the following.
PVC: Polyvinyl chloride resin sheet
PP: Polypropylene resin sheet
ABS: Acrylonitrile-butadiene-styrene copolymer sheet This international application claims the benefit of priority to Japanese Patent Application No. 2015-085267 filed on Apr. 17, 2015. The entire contents of the Japanese Patent Application No. 2015-085267 are incorporated in this international application.

The presently disclosed embodiments are to be construed in all aspects as illustrative and not restrictive. The scope of the invention is indicated by the claims, and all changes coming within the meaning and equivalency range of the appended claims are intended to be embraced in the embodiments.

DESCRIPTION OF REFERENCE SIGNS

1 Decorative sheet
2 Release layer
3 Adhesive layer
4 Skin layer
5 Shape retention layer

The invention claimed is:

1. A decorative sheet comprising:
a release layer;
a pressure-sensitive adhesive layer disposed on a surface of the release layer; and
a skin layer disposed on a surface of the pressure-sensitive adhesive layer, the skin layer comprising polyvinyl chloride resin,
wherein,
the release layer includes a shape retention layer, and an easy release layer interposed between the pressure-sensitive adhesive layer and the shape retention layer, wherein the easy release layer comprises polypropylene resin;
the shape retention layer is a resin sheet made from an acrylonitrile-butadiene-styrene copolymer; and
the shape retention layer has a thickness of not less than 100 µm and not more than 700 µm.

2. The decorative sheet according to claim 1, wherein the shape retention layer has a softening start temperature of not less than 80° C. and not more than 150° C.

3. The decorative sheet according to claim 1, wherein the shape retention layer has a rate of elongation at 120° C. of not less than 200%.

4. The decorative sheet according to claim 2, wherein the shape retention layer has a rate of elongation at 120° C. of not less than 200%.

5. The decorative sheet according to claim 1, wherein the shape retention layer has a thickness of greater than 200 µm and not more than 700 µm.

* * * * *